United States Patent
Buttyan et al.

(10) Patent No.: US 7,409,552 B2
(45) Date of Patent: Aug. 5, 2008

(54) METHOD FOR SECURING COMMUNICATIONS BETWEEN A TERMINAL AND AN ADDITIONAL USER EQUIPMENT

(75) Inventors: Levente Buttyan, Morges (CH); Edwin Wiedmer, Bern (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 962 days.

(21) Appl. No.: 10/260,590

(22) Filed: Sep. 30, 2002

(65) Prior Publication Data

US 2003/0041244 A1 Feb. 27, 2003

Related U.S. Application Data

(63) Continuation of application No. PCT/EP00/09121, filed on Sep. 18, 2000.

(30) Foreign Application Priority Data

Apr. 28, 2000 (EP) .................................. 00109220

(51) Int. Cl.
*H04L 9/00* (2006.01)
(52) U.S. Cl. ....................... 713/172; 380/259; 380/282; 380/270; 713/173
(58) Field of Classification Search ................ 380/259, 380/282, 270; 705/66, 67; 713/172, 176, 713/159, 173; 726/9, 20
See application file for complete search history.

(56) References Cited

U.S. PATENT DOCUMENTS

| | | | | |
|---|---|---|---|---|
| 4,637,051 A | * | 1/1987 | Clark | 382/101 |
| 5,001,752 A | * | 3/1991 | Fischer | 713/178 |
| 6,016,957 A | * | 1/2000 | Ohki et al. | 235/380 |
| 6,072,875 A | * | 6/2000 | Tsudik | 380/270 |
| 6,173,400 B1 | * | 1/2001 | Perlman et al. | 713/172 |

FOREIGN PATENT DOCUMENTS

WO    WO 99 44114 A    9/1999

OTHER PUBLICATIONS

Bruce Schneier: Applied Cryprography 2nd Edition, John Wiley and Sons Pub., Oct. 1995, pp. 53-54.*
Friedrichs, B., "Authentic and Reliable Mobile Communication For Safety-Related Applications Part 1: Requirements And Basic Algorithms" Frequenz, DE, Schiele und Schon GmbH. Berlin, vol. 49, No. 1/02, 1995, pp. 17-27.
Haartsen, JC: "The Bluetooth Radio System", IEEE Personal Communications, IEEE Communications Society, US, vol. 7, No. 1, Feb. 2000.

* cited by examiner

*Primary Examiner*—Matthew Smithers
*Assistant Examiner*—Paul Callahan
(74) *Attorney, Agent, or Firm*—Pearne & Gordon LLP (57) ABSTRACT

Method for securing a session over a radio or infrared wireless link (101) between a terminal (11) and a mobile equipment (10), said session being secured with a SIM card (100) in said mobile equipment (10). The terminal (11) and the mobile equipment (10) both comprise a display and a keyboard or keypad and can be mutually connected through said short distance wireless link (101). The method comprises the following steps:
 generating a secret in one of said terminals or said smart cards,
 displaying this secret on the display of said terminal (11) or said user equipment (10),
 entering said secret or the hash value of said secret on the input means of the other one of said terminals (11) or user equipments (10),
 using said shared secret for securing at least a part of said session over said short distance wireless link (101).

34 Claims, 7 Drawing Sheets

METHOD FOR SECURING COMMUNICATIONS BETWEEN A TERMINAL AND AN ADDITIONAL USER EQUIPMENT

This application is a continuation application of PCT/EP00/09121 filed on Sep. 18, 2000, whose content is included by reference. It claims priority of European Patent Application EP00109220.4, filed Apr. 28, 2000, whose content is included by reference.

FIELD OF THE INVENTION

The present invention concerns a method for securing a session over a short distance wireless link between a terminal and an additional user equipment, for example between a personal computer and a mobile equipment. More specifically, the present invention concerns a method for securing a session between a terminal and a user equipment comprising cryptographic computing means, for example in a smart card.

RELATED ART

Mobile equipments including cryptographic computing means and short distance wireless connections are already known. Such mobile equipments include personal digital assistants (PDAs) and mobile phones comprising a smart card reader and a radio or infrared interface. A smart card containing a user identification and/or an identification of the equipment can be inserted in the smart card slot of the equipment in order to provide for a secure authentication in a telecommunication network, e.g. a mobile telecommunication network. The smart card may contain cryptographic computing means, for example a processor and a memory containing a program which can be executed by the processor for computing cryptographic functions, for securing sessions over the mobile network. The short distance wireless interface allows for a data transfer and/or synchronization between the mobile equipment and other terminals or computers in the vicinity.

On the other hand, terminals are already known that require the user to be authenticated in order to access the requested services. Such terminals include e.g. personal computers, POS in a shop, bank tellers, etc. The user is usually authenticated with a secret typed on a keypad, for example with a PIN or password, using biometric parameters, for example a retina or finger pattern, and/or with a smart card.

The most common way to authenticate an end-user is to ask for her password. This is weak authentication, because passwords are often easy to guess and because this method is vulnerable to replay attacks. It can be made stronger by choosing hard-to-guess passwords and using a list of one-time passwords, but these approaches often result in writing down the password(s) on a sheet of paper, which is poor security practice for obvious reasons.

Biometric authentication methods may provide better security but are sometimes felt intrusive. Biometric sensors are usually slow and expensive; the failure rate, i.e. the rate at which an entitled user cannot be authenticated, is higher than with other methods.

The application of smart cards in user authentication enables the introduction of strong authentication, which is based on cryptographic techniques, because the smart card can perform cryptographic operations and store cryptographic keys for the user. Using smart cards, however, requires smart card readers to be installed at the points of authentication and users to produce a smart card and to introduce it in an untrusted equipment.

The present invention is concerned with solutions for using the user equipment (such as a mobile phone or a personal digital assistant) as the smart card reader, or more generally as cryptographic computing means for authenticating the user when he wants to use a terminal. More specifically, the present invention is concerned with solutions for connecting the user mobile equipment to fixed or public terminals using short distance wireless communication (e.g. Bluetooth, HomeRF or infrared).

It has already been suggested to use the user terminal, for example the user mobile phone, as a smart card reader which can connect to fixed and public terminals (e.g., a PC or a POS terminal in a shop) via a short distance wireless interface. Those methods have the following advantages:

- in general, the personal mobile device of the user allows the user to directly communicate with her smart card (the mobile device has a keypad and a display); if traditional smart card readers are used, then the user has to type on the keyboard of the terminal and the smart card can only display messages on the display of the terminal, thus a malicious terminal can alter the communication between the user and the smart card;
- in particular, the smart card is never inserted into an untrusted device, which could try to obtain more data from the smart card than it should; and
- the PIN code that is assigned to the smart card is never typed into an untrusted device, which can misuse or steal it;
- furthermore, there is no need to install smart card readers everywhere and to adapt them to various card formats.

Applications of the above type pose some new security problems. The main one is the problem of mutual authentication between the smart card and the fixed terminal in the presence of other, potentially malicious users. Other security problems may also arise (e.g. problems related to integrity, confidentiality and privacy).

The main technical problem is that, despite the use of low level security elements during the establishment of the communication channel between the personal mobile device (smart card reader) and the terminal (point of authentication), as described for example in the case of a Bluetooth system in HAARTSEN J C: "THE BLUETOOTH RADIO SYSTEM" IEEE PERSONNAL COMMUNICATIONS, IEEE COMMUNICATIONS SOCIETY, US, Vol. 7, no. 1, February 200 (2000-02), pages 26-36, the communication channel is not secure. When the card reader is built in or physically connected (with a short wire) to the fixed terminal, then the messages sent between the card and the terminal cannot be eavesdropped, modified, replayed, etc. by an attacker. This would require physical access to the terminal, the card reader, or the wire that connects them. Moreover, after initial mutual authentication, the card and the terminal can be sure that the messages they receive during the rest of the session come form the other party. When the communication between the smart card and the terminal is based on wireless technologies, then an attacker could eavesdrop and replay messages between them, and the card and the terminal can never be sure whether the messages they receive come from the other party or from other smart cards and terminals which are potentially present.

Figure 1:
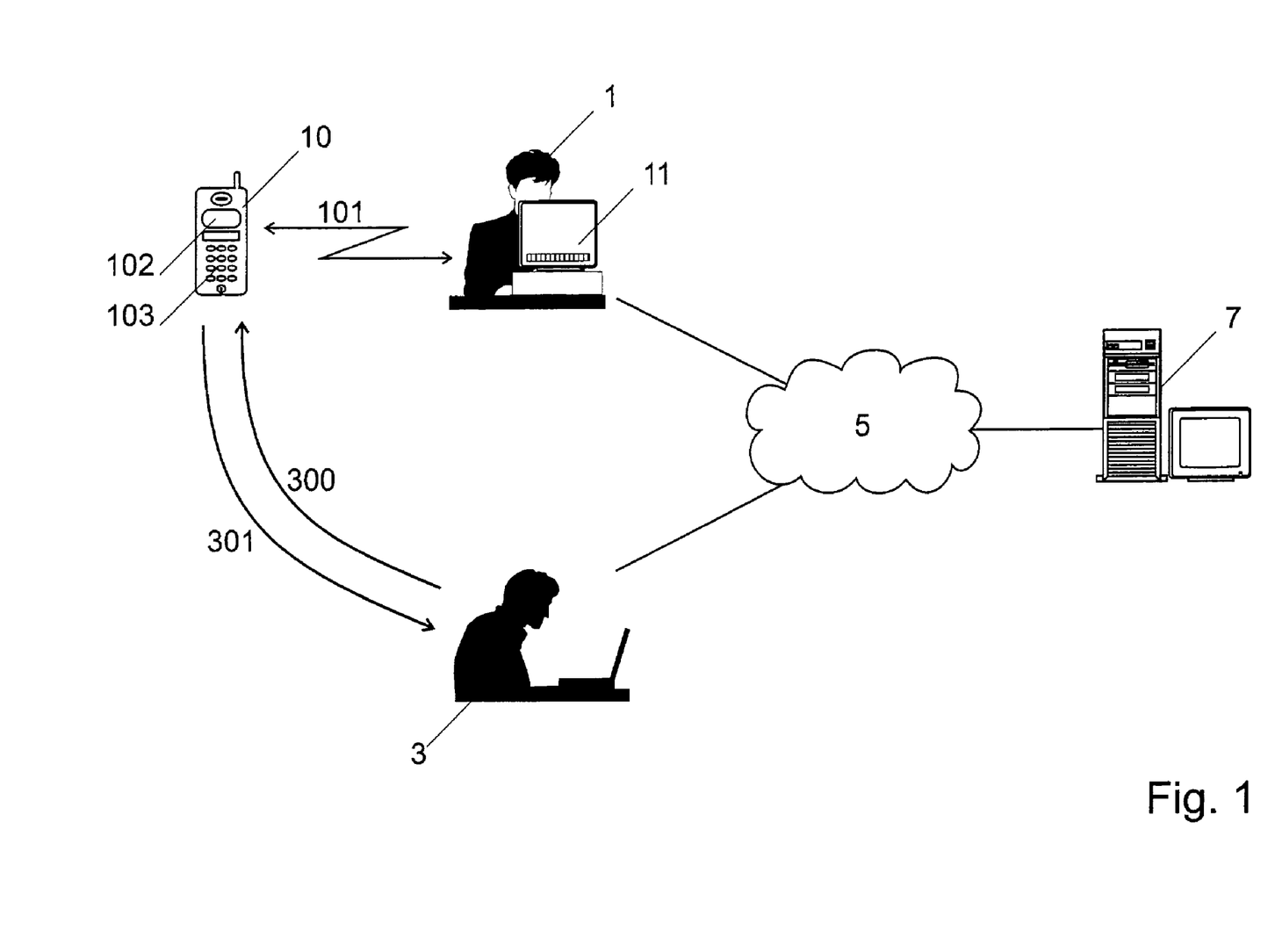
FIG. 1 illustrates an attack, when communication between terminal and additional user equipment is insecure.

This problem is illustrated in FIG. 1. In this Figure, user Alice 1 wants to access a web server 7 through the Internet 5 using her mobile equipment 10 as a smart card reader connected to a fixed terminal 11, e.g. a personal computer or a POS in a shop, via a wireless interface 101. An eavesdropper 3 could send a challenge 300 to her mobile and get its response 301 to this challenge; this response can then be used for impersonating Alice with the server 7.

Therefore, there is a need for a new method which allows a user 1 to access a remote server 7 from a mobile equipment 10 through a short distance wireless interface 101 and a terminal 11 which is more secure than existing methods and which guarantees that the right mobile equipment 10 is connected to the right terminal 11 through wireless interface 101.

BRIEF SUMMARY OF THE INVENTION

According to the invention, this problem is solved with a new protocol that builds a secure (authentic and/or confidential) logical channel between the cryptographic computing means on the user mobile side and the terminal 11. The secure logical channel is based on a secret that is exclusively shared by the smart card in the mobile 10 and the terminal 11, and on the application of cryptographic techniques. The main job of the inventive protocol is the safe establishment of this shared secret.

According to an aspect of the invention, the secret generated in one of said terminals or said user equipments, or the hash value of this secret, is displayed on the display of said terminal or of the user's equipment, and entered by the user on the input means of the other of one of said terminals or user's equipments.

The present application describes cryptographic protocols for mutual authentication between the smart card in the mobile 10 and the fixed terminal 11. In particular, two embodiments of the inventive method are described.

According to another aspect of the invention, the secure channel that is established is an authentic channel. This means that the communication parties can be sure that if they receive a message on this channel, then it comes from the other party, and it is not a fake message sent by an attacker. The protocol can also be used to prevent eavesdropping (i.e. to establish an authentic and a confidential channel).

If confidentiality is a requirement, then the shared secret that is established by the protocols should be used for encryption and not for computing a message authentication code (as it is described in the specification). Those modifications can be done without any difficulties by one skilled in the art.

According to another aspect of the invention, the user has a smart card and a personal mobile device, in which the smart card can be inserted, and which has short distance wireless communication capabilities. The inventive method would, however, work as well if the user has a personal digital assistant which has short distance wireless communication capabilities. Thus, there is no real need for smart cards. A PDA can replace the smart card, because it can assist the user by performing cryptographic operations just as the smart card does.

DETAILED DESCRIPTION OF THE INVENTION

In the following description, we will assume that the target application is access control to confidential Web pages, although the inventive method can easily be adopted for other applications as well (e.g. access control to a private mail box, to a remote file system, to a remote service provider such as a financial institute, etc.). A well known protocol for secure Web transactions is the Secure Socket Layer (SSL). In fact, SSL is a general-purpose security protocol that provides a secure transport layer for any applications that use it. In Web-based applications, it is used to build a secure transport channel between the Web browser and the Web server. SSL provides unilateral or mutual authentication, integrity and confidentiality services. SSL is supported by most of the well-known Web browsers and Web servers. Therefore, it seems to be a good idea to use SSL for the authentication of users who would like to access confidential Web pages, and for the secure transfer of these Web pages from the server to the user.

User authentication in SSL is based on public key cryptography, and, in particular, on the demonstration of the knowledge of the private key that belongs to the certified public key of the user. The protocol uses the challenge—response principle: the server generates a random number and sends it to the user (challenge); the user (or more precisely her browser) digitally signs the random number using her private key and sends it back to the server (response) together with her public key certificate. The server can verify the signature using the user's public key. Since only the user knows the private key, and a valid signature can only be generated with the right private key, a correct response guarantees to the server that the user is present and has recently sent a message (the response).

Actually, the SSL protocol is slightly more complicated. A simplified version of it (only for the purpose of this discussion) is presented in Table 1, where $r_b$ and $r_s$ are random numbers generated by the browser B (in the terminal 11) and the server 7, respectively; $cert_u$ and $cert_s$ are public key certificates of the user 1 and of the server 7, respectively; s' (pre-master-secret) is another random number generated by the browser B; s (master-secret) is computed from s', $r_s$, and $r_b$ using a publicly known one-way function f (i.e., s=f(s', $r_s$, $r_b$)); $K_s$ is the public key of S obtained from $cert_s$; g is a publicly known cryptographic hash function; and $Sig_u$ denotes the digital signature generated with the user's private key. In the first two messages, the browser and the server 7 exchange their random numbers and the server sends its public key certificate to the browser in the terminal 11. The browser then generates the pre-master-secret s', encrypts it with the server's public key, and computes the master-secret s. Then, it computes the hash value $g(s, msg_1, msg_2)$ of the master-secret and the first two messages of the protocol, as well as the digital signature $Sig_u(g(s, msg_1, msg_2))$, and sends the last message to the server. The server decrypts $\{s'\}_{K_s}$, computes s and the hash value $g(s, msg_1, msg_2)$, and verifies the signature. If the signature is valid, then the user 1 is authenticated. Furthermore, the browser and the server established a shared secret s, which they can use to generate a shared secret session key. This session key, in turn, will be used to encrypt all further messages (application data) between them.

(msg 1) B→S: $r_b$
(msg 2) S→B: $r_s$, $cert_s$
(msg 3) B→S: $cert_u$, $\{s'\}_{Ks}$, $Sig_u(g(s, msg_1, msg_2))$ Table 1. The SSL Protocol (Simplified)

Normally, the browser in the terminal 11 performs all the cryptographic computations at the user's side. This is not the case if smart cards are used in the terminal 11. In that case, the private key needed for generating the digital signature is stored on the smart card 100 of the user 1. Since, for security reasons, the private key should never leave the smart card, the digital signature must be generated by the smart card itself. The modified protocol is shown in Table 2 (with C and U standing for the smart card and the user, respectively).

(msg 1) B→S: $r_b$
(msg 2) S→B: $r_s$, $cert_s$
(msg 3) U→B: PIN
(msg 4) B→C: $g(s, msg_1, msg_2)$, PIN
(msg 5) C→B: $cert_u$, $Sig_u(g(s, msg_1, msg_2))$
(msg 6) B→S: $cert_u$, $\{s'\}_{Ks}$, $Sig_u(g(s, msg_1, msg_2))$ Table 2. SSL with Smart Cards After receiving the second message, the browser can generate s', and compute s and $g(s, msg_1, msg_2)$. But it cannot generate the digital signature. Therefore, it sends the hash value together with the PIN that is assigned to the smart card and obtained from the user to the smart card. The smart card signs the hash value only if the correct PIN is presented. The smart card sends the digital signature and the public key certificate of the user to the browser, which can then complete the SSL protocol with the server.

The security of the above protocol relies on the assumption that the Web browser and the smart card 100 can communicate via a secure channel. This assumption is reasonable if the smart card reader is built in the terminal 11 that runs the browser, or if they are connected directly with a short wire. We cannot, however, make this assumption if the communication between the smart card and the terminal is based on wireless technology.

Here, the following attack against the above protocol would allow an attacker 3 to impersonate a legitimate user. Let us assume that the attacker (A) and the legitimate user 1 (U) are physically close to each other (i.e., the attacker can hear messages sent between the terminal and the user's smart card $C_u$). This means that the attacker 3 can eavesdrop the PIN that is assigned to the smart card 100 of the user 1 by listening on the wireless interface 101 during the authentication of the user. Then the attacker can start an authentication session with the server 7 and coerce the smart card 100 of the user 1 into generating a digital signature when needed. The attack scenario is illustrated in Table 3 and FIG. 1.

A eavesdrops $PIN_{Cu}$
(msg 1) A→S: $r_a$
(msg 2) S→A: $r_s$, $cert_s$
(msg 4) A→$C_u$: $g(s, msg_1, msg_2)$, $PIN_{Cu}$
(msg 5) $C_u$→A: $cert_u$, $Sig_u(g(s, msg_1, msg_2))$
(msg 6) A→S: $cert_u$, $\{s'\}_{Ks}$, $Sig_u(g(s, msg_1, msg_2))$ Table 3. Impersonating a User When the Smart Card Reader is the Mobile Device of the User.

As we have already mentioned before, the main problem is that the smart card 100 in the user's mobile equipment 10 and the terminal 11 cannot be sure that they communicate with each other. Sending the PIN is not enough, as it is clear from the attack described. The inventive method offers a solution to this problem. Two embodiments of the inventive method can guarantee the authenticity of messages sent between the smart card 100 and the terminal 7. These embodiments are presented in the next subsections.

Principals, Channels, and Goals

Figure 2:
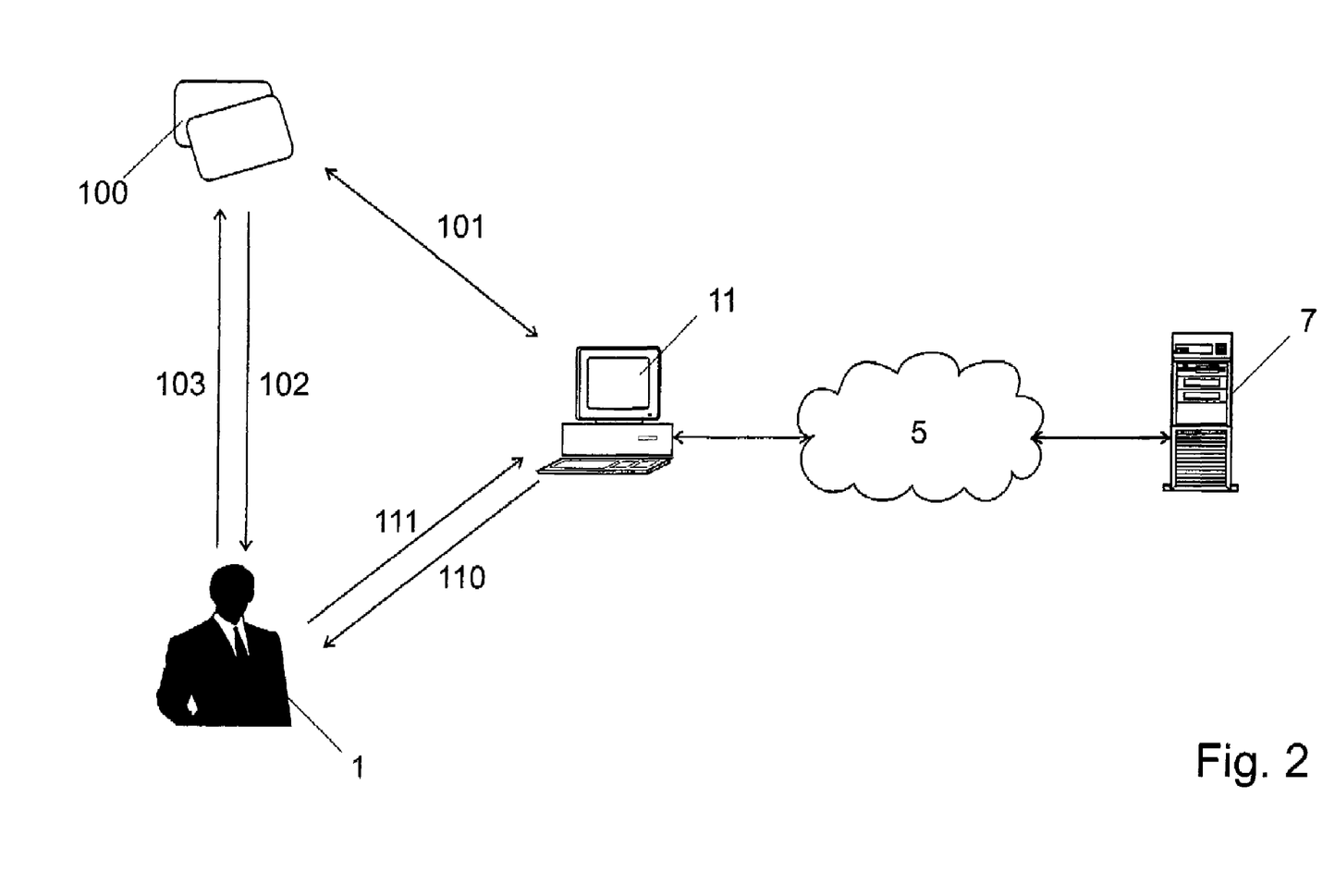
FIG. 2 illustrates the principals and the channels of a system including a remote WEB or data file server.

Following the design methodology of cryptographic protocols, we start by identifying the principals (main actors) and the existing channels among them (i.e., constructing a model). These components are illustrated in FIG. 2.

The principals are:
U: the user 1
C: her smart card 100 (more exactly the cryptographic computing means in the smart card 100 or in the user's equipment 10); the smart card may be a SIM card or a WIM card with a GSM or UMTS part.
T: the terminal 11 used by the user 1, and which may run a Web browser.

The physical channels are:
md: the display 102 of the user's equipment (mobile device) (C→U)
mk: the keypad 103 of the user's equipment (U→C)
td: the display 110 of the terminal (T→U)
tk: the keyboard 111 of the terminal (U→T)
wl: the wireless link 101 between the smart card 100 and the terminal 11 (C⇌T)

An interesting feature of the model above is that the mobile equipment 10 of the user 1 is modeled as a channel rather than as a principal as one may have expected it. Since the mobile device 10 does not perform important cryptographic computations and store important secrets, we felt that it would not be appropriate to model it as a principal. The most important characteristic of the mobile device 10 (at least from the security point of view) is that it has a keypad 103 and a display 102 that allows the user 1 to communicate directly (not via the terminal) with her smart card 100. Therefore, we modeled the mobile device 10 as physical channels (with restricted access) between the user 1 and her smart card 100. This is, of course, our personal decision. One might include an additional principal in the model, which represents the mobile device, but we believe that this would only make the model more complex and would not bring any advantages for the modeler. However, if the cryptographic computing means are implemented by a software and/or hardware module in the mobile equipment 10, the principal C will represent this module.

We make the following assumptions about the channels:
The mobile display 102 md is authentic and timely. Authenticity means that if the mobile device 10 shows a message and states that this message comes from the smart card 100, then indeed the message comes from the smart card 100. Timeliness means that the mobile device 10 does not maliciously delay messages originating from the smart card 100, but displays them as the card generates them. This, of course, means that the mobile device is trusted: the user believes that it has not been tampered by anybody and that it behaves correctly.

The mobile keypad 103 mk is authentic and timely. We assume that only the user 1 of the smart card 100 can send messages to the smart card via the keypad 103 of the mobile device. Requiring the user 1 to enter the PIN assigned to the smart card 100 when the card is inserted in the mobile device 10 can ensure this. Furthermore, we assume that the mobile device 10 does not maliciously delay the input from the user 1, but delivers it to the card 100 as the user enters it.

The terminal display 110 td is authentic and timely. This means that messages displayed on the screen 110 of the terminal 11 originates from the terminal and at the time at which they are displayed.

The terminal keyboard 111 tk is authentic and timely. By this we mean that messages arriving via the keyboard 111 of the terminal 11 originate from the user 1, who is currently facing the terminal. Furthermore, the keyboard 111 does not introduce any delay in the communication between the user 1 and the terminal 11, but delivers keystrokes to the terminal instantaneously.

The wireless link 101 wl between the mobile equipment 10 and the fixed terminal 11 is insecure. We assume that passive attacks (eavesdropping) and active attacks (message modification, generation and replay) are possible on the wireless link between the smart card and the terminal.

In addition to the physical channels, there are two logical channels as well:

Sig$_u$: the channel realized by the digital signature with the private key of the user 1.

K$_u$: the channel implemented by the encryption with the public key of the user 1.

We make the following usual assumptions about these channels:

Sig$_u$ is an authentic channel from the smart card 100, because only the smart card knows the private key of the user 1; thus, one can be sure that messages that are signed with this private key originate from the smart card 100.

K$_u$ is a confidential channel to the smart card 100, because only the smart card can decrypt messages that are encrypted with the public key of the user 1. Note that neither Sig$_u$ nor K$_u$ is a timely channel, because neither the digital signature nor the encryption alone provides any freshness guarantees.

We are now ready to state our design goal informally: we are seeking a protocol that establishes an authentic logical channel between the terminal 11 and the smart card 100 using only the already existing physical and logical channels described above.

First Embodiment of the Invention

This first embodiment of the inventive method can be used if the following additional assumptions about the existing channels are fulfilled:

(1') the user's mobile display 102 md is not only authentic, but (at least for a short amount of time) it is also confidential, meaning that only the user 1 (the owner of the smart card 100) can see the display of the mobile device. We will denote this short time channel by md'.

(4') the terminal keyboard 111 tk is not only authentic but (at least for a short amount of time) it is also confidential, which means that nobody can see what is typed on the keyboard 111 of the terminal 11. We will call this short time channel tk'.

Clearly, the assumption that the mobile display md and the terminal keyboard tk are confidential would be hard to justify in general. What makes those assumptions reasonable is limiting the time during which they are needed. The smart card 100 can, for instance, send a notification message to the user 1 before displaying some private information on the display 102 of the mobile device 10. The user 1 can then hide the display 102 (which has a small size) and confirm the notification. The private information is displayed only after the confirmation of the user 1 and only for a short period of time. Turning off the echoing of keystrokes on the display 110 of the terminal 11 can, for instance, transform the terminal keyboard 111 tk into a confidential channel for a short amount of time (i.e., into tk'). This technique is frequently used to hide passwords when entering them in the login window on a computer. Theoretically, of course, it is still possible to catch the password simply by observing the hands of the typing user 1, but in practice, this method is considered to be sufficiently secure. Therefore, we believe that (at least in not highly security critical applications) the assumptions 1' and 4' are reasonable and hold.

Figure 3:
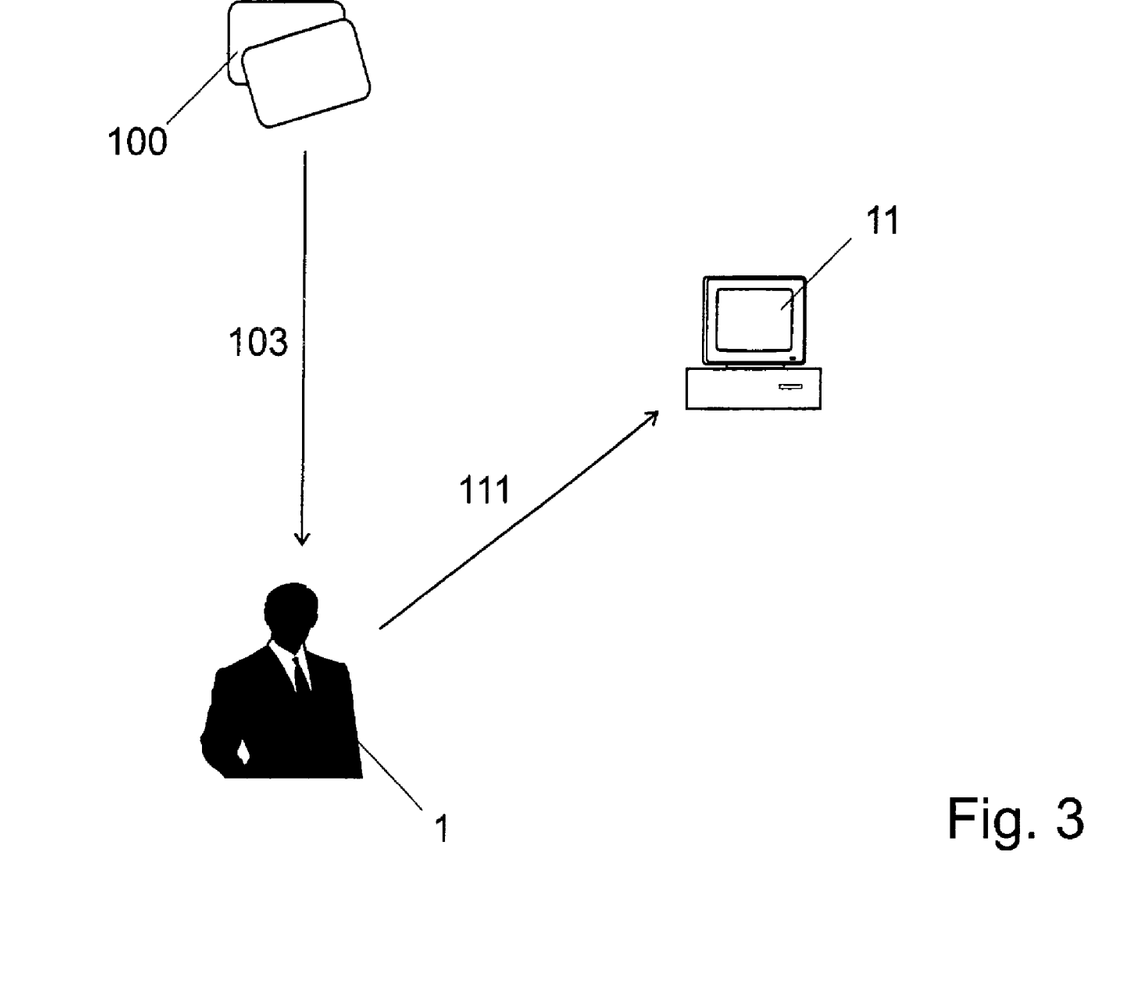
FIG. 3 illustrates the transmission of the shared secret through secure channels via the user in a first embodiment of the invention.

This means that there exists an authentic and confidential channel from the smart card 100 to the terminal 11, which is formed by the combination of the display 102 of the mobile device 10, the user 1, and the keyboard 111 of the terminal 11. This channel is illustrated in FIG. 3: confidential data stored in or generated by the smart card 100 can be displayed on the mobile display 103 and entered by the user 1 on the keyboard 111 of the terminal 11. The data transferred over the channel 103, 111 can include a secret which can be shared between the smart card 100 and the terminal 11 and used for securing a complete transfer session over the wireless interface 101. The details are given in the next subsection.

Protocol Description

This first embodiment of the inventive protocol is illustrated in Table 4 and described as follows:

$$C \rightarrow U: r$$

The smart card 100 generates a random number r and displays it on the display 102 of the mobile device 10. Here, we assume that the display is made confidential for the time of displaying r, thus, only the user 1 can see r (i.e., actually, r is sent via md').

$$U \rightarrow T: r$$

The user 1 enters r into the terminal 11. Here we assume that the keyboard 111 of the terminal 11 is made confidential for the time of entering r, which means that nobody can see r (i.e., actually, r is sent via tk').

$$T \rightarrow C: m, MAC_r(m)$$

$$C \rightarrow T: m', MAC_r(m')$$

The smart card 100 and the terminal 11 now have a shared secret r, which they can use for protecting the integrity and proving the authenticity of the subsequent two messages m and m' that they send to each other via the wireless link wl. This can be done by computing a message authentication code (MAC) and attaching it to the message. The computation of the MAC depends on the shared secret r in a way that computing a valid MAC for a given message is hard without the knowledge of r. Thus, only the terminal 11 and the smart card 10 can generate a valid MAC$_r$ for messages m and m'.

An example of computation of message authentication codes (MAC) is for instance given in FRIEDRICHS B: "AUTHENTISCHE UND ZUVERLASSIGE MOBILKOMMUNIKATION FUR SICHERHEITSRELEVANTE ANWENDUNGEN AUTHENTIC AND RELIABLE MOBILE COMMUNICATION FOR SAFETY-RELATED APPLICATIONS PART 1: REQUIREMENTS AND BASIC ALGORITHMS" FREQUENZ, DE, SCHIELE UND SCHON GMBH. BERLIN, vol. 49, no 1/02, 1995, pages 17-27.

We should note that the user 1 also knows r, and, thus, she can also generate a valid MAC for any message. This means that, theoretically, the user 1 could also have sent m, MAC$_r$(m) or m', MAC$_r$(m'). We, however, exclude this possibility, because we assume that the user 1 does not have the means to compute cryptographic functions and send messages on the wireless link 101. Furthermore, the user 1 is not interested in interfering with the protocol between her smart card 100 and the terminal 11.

(msg 1) C→U: r
(msg 2) U→T: r
(msg 3) T→C: m, $MAC_r(m)$
(msg 4) C→T: m', $MAC_r(m')$ Table 4. First Embodiment The security of this solution heavily depends on the above assumptions (1') and (4'). If these were not true, then someone could learn r and construct fake messages in the name of T or C. It is also important that the $MAC_r$ function satisfies certain standard properties, and that the entropy of r is sufficiently large (i.e., r is sufficiently long and random (unpredictable)). This latter issue is addressed later.

Integration with SSL

Figure 4:
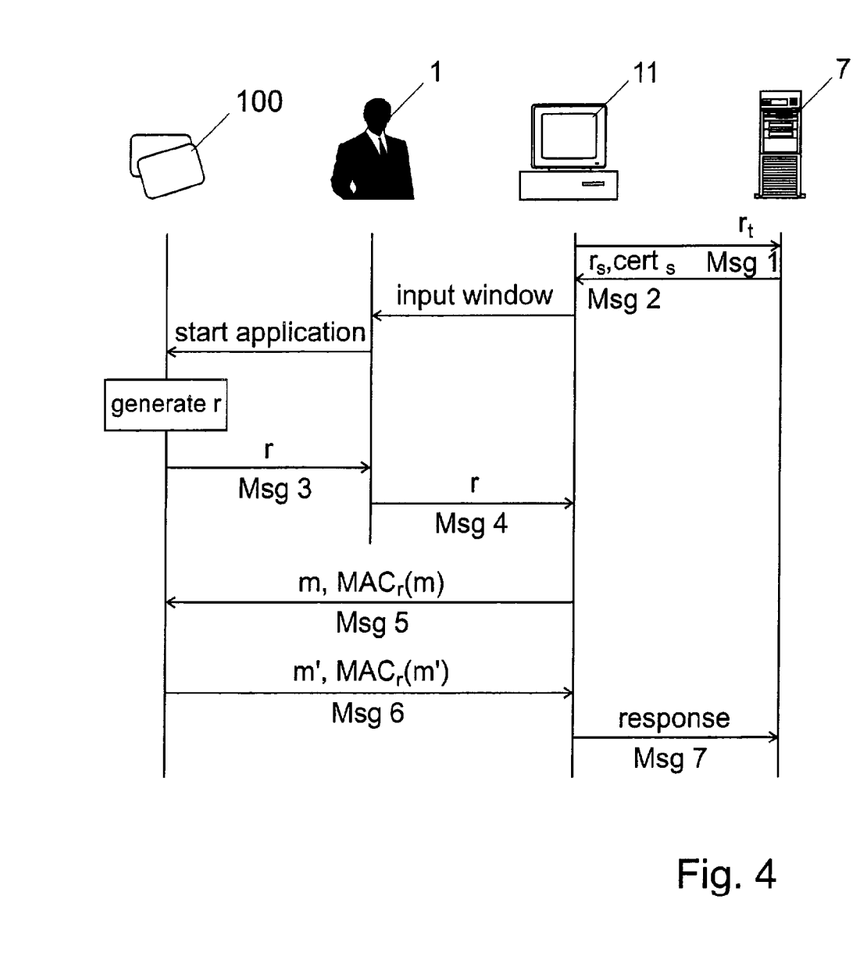
FIG. 4 illustrates the messages which are exchanged between the principals over the various channels in the first embodiment of the invention.

This first embodiment can be integrated with the SSL protocol, as it is shown in Table 5 together with FIG. 4, making it possible to use SSL with smart cards 100, where the smart card reader is the mobile device 10 of the user 1.

(msg 1) T→S: $r_t$
(msg 2) S→T: $r_s$, $cert_s$
(msg 3) C→U: r
(msg 4) U→T: r
(msg 5) T→C: m, $MAC_r(m)$
    where m=g(s, $msg_1$, $msg_2$),
    g: publicly known hash function
(msg 6) C→T:, m', $MAC_r(m')$
    where m'=$cert_u$, $sig_u(m)$
    $sig_u$: user's signature
(msg 7) T→S: $cert_u$, $\{s'\}_{Ks}$, $Sig_u(g(s, msg_1, msg_2))$ Table 5. Integration of the First Embodiment of the Invention with SSL The terminal 11 starts the SSL protocol with the server 7. When it gets to the point where it needs to sign the challenge m including the random number $r_s$ sent by the server 7 with the digital signature $sig_u$ of the user 1, it displays an input window, and waits for the user 1 to input the random number r. The user 1 instructs her smart card 100 to generate r (e.g. she starts the appropriate application on the mobile device 10, which sends the instruction to the smart card 100). The smart card 100 generates r and displays it on the display 102 of the mobile device 10. The user 1 enters r in the input window of the terminal 11. The terminal 11 then computes the challenge m to be signed, which is equal to the hash value g(s, $msg_1$, $msg_2$), and sends it together with the $MAC_r(m)$ that is used to prove authenticity of the message to the smart card 100 via the wireless link 101. After successful verification of the authenticity of the message msg5, the smart card 100 generates the digital signature of the challenge m and sends it to the terminal 11 together with the public key certificate of the user 1. This message is protected with a $MAC_r$ in a similar way as the previous one. When the terminal 11 receives the signature, it completes the SSL protocol with the server 7.

As we have mentioned before, the security of this protocol depends on the entropy of the random number r. If this entropy is low, then:

(a) brute force attacks for generating a valid m, $MAC_r(m)$ pair become feasible and (b) an attacker can figure out r from an observed m, $MAC_r(m)$ pair with a limited effort.

Figure 5:
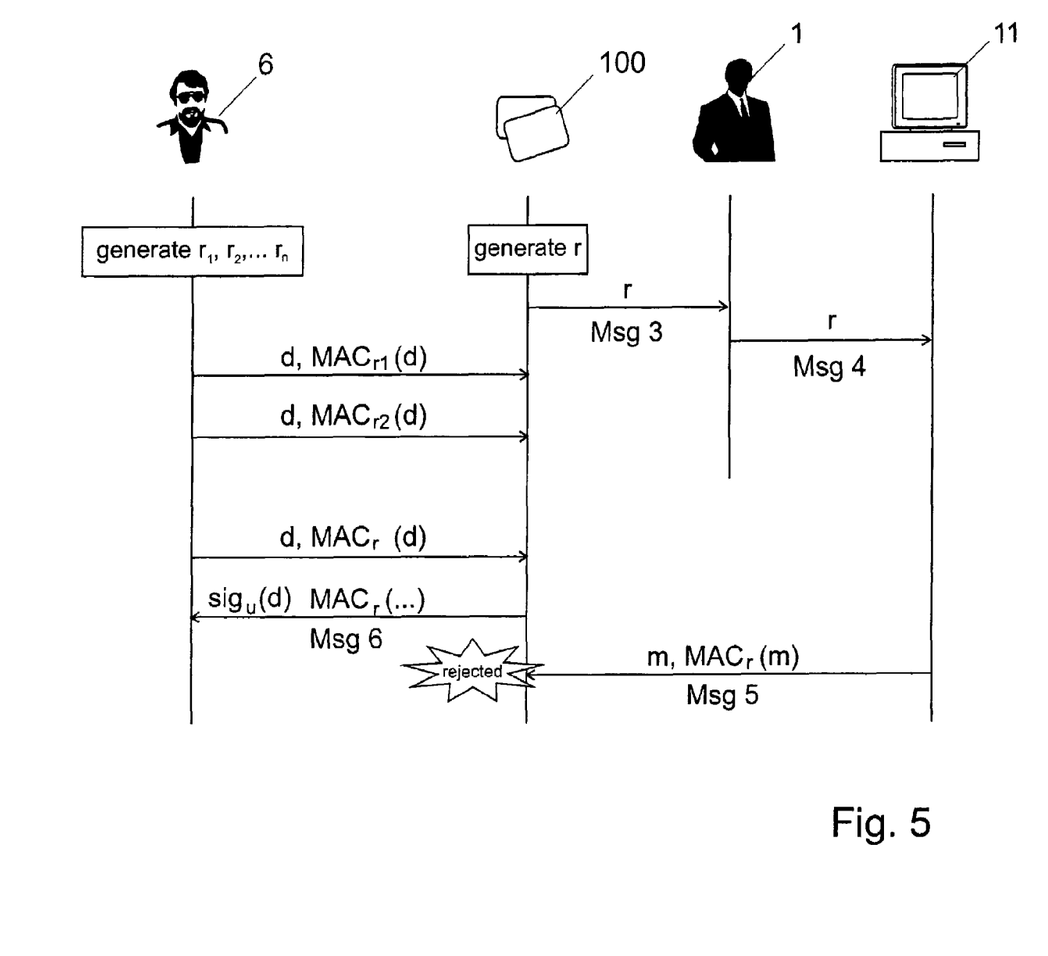
FIG. 5 illustrates the messages which may be sent by an attacker in the first embodiment of the invention.

If this protocol is used together with SSL, as it was described in the previous subsection, then (a) can have serious effects, which make the attack illustrated in FIG. 5 possible. Assume that the attacker 6 wants to obtain the digital signature $sig_u$ of the user 1 on some data d (e.g. The attacker A started the SSL protocol with the server 7 and now he is required to digitally sign a hash value d, but he wants to impersonate U, thus, he wants to obtain the digital signature from U). Furthermore, let us assume that the attacker 6 is physically close to the user 1. The attacker 6 generates the random numbers $r_1, r_2, \ldots, r_n$, and the fake messages $msg_5$', $msg_5$" (d, $MAC_{r1}(d)$), (d, $MAC_{r2}(d)$), ..., (d, $MAC_{rn}(d)$) in advance. When the attacker 6 sees that user 1 starts to type the random number r generated by her smart card 100 in the input window on the terminal 11, he starts sending the fake messages to the smart card 100. The smart card 100 is in a listening state, which means that it receives these fake messages and verifies each. If the entropy of r is low, then it is highly probable that r is in $\{r_1, r_2, \ldots, r_n\}$ even if n is not too large. Thus, the attacker 6 will succeed, with high probability, in sending d, $MAC_r(d)$ to the smart card 100 before the user 1 finishes typing and the terminal 11 sends its message. The smart card 100 accepts d, $MAC_r(d)$ as an authentic message coming from the terminal 11, signs d, and sends the result $sig_u(d)$, $MAC_r(sig_u d)$ ($msg_6$) back to the attacker 6. The challenge m, $MAC_r(m)$ sent by the authentic terminal 11 will then be rejected by the smart card 100.

This attack shows why it is so important that the entropy of r be large. Ideally, r should be a sufficiently long true random number. This, however, would make it difficult for the user 1 to type it in the terminal 11. In order for the protocol to be practically usable, r should be short. If practical usability is an important requirement, the protocol can be extended with additional measures so that the length of r can be reduced without losing the resistance against the brute force attack described above.

One possible extension can be the introduction of a time-out. When the smart card 100 displays the secret number r on the display 102 of the mobile device 10, it can start a timer. It will then accept messages from the wireless link 101 only for a limited amount of time. If the timer expires before receiving a valid message from the terminal 11, then the protocol stops, and it has to be restarted from the beginning. This limits the available time for an attacker to mount a brute force attack, such as described above.

Although the smart card 100 has a clock signal received from the mobile device 10, implementing a timer on the smart card is not easy. Thus, the timer can be implemented on the mobile device 10, which should signal the time-out to the smart card 100.

Let us denote the time required for verification of the $MAC_r$ of a single message on the smart card by t. We assume that the smart card 100 is not capable of performing parallel computations, and, thus, that it deals with a single message at a time. Let r be a random number of b bits. Then the average time required for a successful brute force attack is $t2^{b-1}$. Thus, the time-out T on the smart card should be much less than $t2^{b-1}$ (i.e., $T<<t2^{b-1}$). In other words, $b>>\log(T/t)+1$. We calculated the value of $\log(T/t)+1$ for different values of t assuming that T=10s (note that T must be sufficiently long in order for the user to be able to type r in the terminal). The results are shown in Table 6.

TABLE 6

Value of log(T/t) + 1 for different values of t assuming that T = 10s

| | t = 0.25 ms | t = 0.5 ms | t = 1 ms |
|---|---|---|---|
| b >> log(T/t) + 1 | 16.2 | 15.2 | 14.2 |

The average time of a successful brute force attack for some possible values of t and b is shown in Table 7. Compare the values to 10s, the time available for the attack.

TABLE 7

Average time of a successful brute force attack ($t2^{b-1}$) for different values of t and b

|  | t = 0.25 ms | t = 0.5 ms | t = 1 ms |
|---|---|---|---|
| b = 20 | 2 min | 4 min | 8 min |
| b = 30 | 34.8 hours | 2.9 days | 5.8 days |
| b = 40 | 3.9 years | 7.9 years | 15.9 years |

Another possible extension, which could be combined with the first one, would be the limitation of the number of messages that the smart card 100 receives and verifies after having displayed the random number r. It can, for instance, set a counter when displaying r, which is decremented each time the smart card 100 receives a message on the wireless link 101. If the smart card does not receive a valid message before the counter reaches 0, then the protocol stops, and it has to be restarted from the beginning. This limits the number of possible attacker attempts to feed the smart card 100 with a fake message.

Let r again be a random number of b bits. Then, the average number of attempts required for a successful brute force attack is $2^{b-1}$. Possible values are shown in Table 8.

TABLE 8

Average number of attempts required for a successful brute force attack for different values of b

|  | b = 20 | b = 30 | b = 40 |
|---|---|---|---|
| $2^{b-1}$ | $10^{5.7}$ | $10^{8.7}$ | $10^{11.7}$ |

Let us denote the maximum number of possible failed attempts by a (the value of the counter at the beginning of the protocol). The only limitation on a is that a should be greater than the number of terminals 11 that are in the communication range of the smart card 100. These terminals can run the protocol at the same time and generate legal messages that are received but obviously not accepted by the smart card 100. The potential number of these legal messages should be less than the number of possible failed attempts, otherwise the neighboring terminals may use up all the possibilities and the smart card 100 cannot receive the expected message from the right terminal. We expect that the typical value for a will be between 10 and 50. Compare this with the average number of attempts required for a successful brute force attack given in Table 3.

Considering the calculations above, we propose in a preferred embodiment to set the length of r at 40 bits. Then applying any, or both, of the two measures described above reduces the probability of a successful brute force attack to a negligibly small value. The 40 bit long r can be represented by an 8 character long string, where the characters are from the set $\{0, 1, \ldots, 9, A, B, \ldots, V\}$. This set has 32 elements, thus, each character can represent 5 bits.

The second problem (b) with a low entropy r is that it becomes feasible for an attacker A to find r by observing a single m, $MAC_r(m)$ pair. This can be done in the following way. When the terminal 11 sends m, $MAC_r(m)$ to the smart card 100 (e.g. m may be the hash value that has to be signed by the card), the attacker A can eavesdrop on it. Then A can repeatedly generate a random number r', and check if $MAC_{r'}(m)$ is equal to $MAC_r(m)$. If a match is found for some r', then r=r' with a high probability. If the entropy of r is low, A might find r before the smart card 100 responds to the terminal 11.

This makes it possible for the attacker to send a fake message to the terminal 11 in the name of the smart card 100.

Although the attack just described is a valid one, it does not pose too many problems if the inventive method is used together with SSL. What an attacker can achieve with this attack is that the terminal 11 sends some fake data d, d' to the server 7 in the last step of SSL, instead of the expected public key certificate $cert_u$ and digital signature $sig_u$ of the user 1. This will result in the failure of user authentication, but no confidential data will be revealed to the attacker. These kinds of attacks are called denial-of-service attacks, and they are very difficult to prevent in general. In a preferred embodiment of the invention, the terminal 11 can avoid sending useless data to the server 7 by verifying the message m', $MAC_r(m')$ received from the smart card 100. The message should contain a public key certificate $cert_u$ and a digital signature $sig_u$ on the hash value that has been sent to the smart card 100 by the terminal 11 in the previous message. Furthermore, the digital signature should be verifiable with the public key obtained from the certificate.

We will now describe an example of the pseudo-code which may be run by the computing means in the smart card 100 and by the terminal 11 in order to carry out this first embodiment. The one skilled in the art will be able to write the necessary modules in the smart card and in the terminal which correspond to those pseudo-codes.

Pseudo-Code Run by the Smart Card 100
1. One time setup: initialise a random number generator PRNG in the smart card with a truly random seed
2. Get next random number r from the random number generator PRNG
3. Display r (in base 32 encoding) on the display 102 of the mobile device 10 for some seconds (msg 3)
4. Initialise a counter: c=20 (for example)
5. Listen on the wireless interface 101 until a broadcast message arrives: msg5.
6. If msg5=m, MAC (msg5 has the appropriate format), then go to step 7, else go to step 5
7. Compute the $MAC_r$ of m: $MAC_r(m)$
8. If mac=$MAC_r(m)$, then go to step 11, else go to step 9
9. Decrement the counter: c=c−1
10. If c=0, then raise an exception and stop, else go to step 5
11. Construct the response: m'
12. Compute the $MAC_r$ of m': $MAC_r(m')$
13. Send msg6=m', $MAC_r(m')$ to the sender of M
14. End of protocol Pseudo-Code Run by the Terminal 11
1. Construct (get) the message to be sent: m
2. Input the random number (in base 32 encoding): r
3. Compute the $MAC_r$ of m: $MAC_r(m)$
4. Broadcast msg5=m, $MAC_r(m)$
5. Listen on the wireless interface 101 until a message arrives: msg6'
6. If msg6=m', MAC' (msg6 has the right format), then go to step 7, else raise an exception and stop
7. Compute the $MAC_r$ of m': $MAC_r(m')$
8. If MAC"=$MAC_r(m')$ then go to step 9, else raise an exception and stop
9. End of protocol Second Embodiment: One-Time Password Setup via the User The above described first embodiment of the invention relies on some confidentiality assumptions about the display 102 of the mobile device 10 and the keyboard 111 of the terminal 11. In some cases, these assumptions may not be reasonable. Let us consider, for instance, a public terminal 11 installed at a busy public place (e.g. airport, railway station, etc.). Someone can watch the hands of the typing user 1 in order to learn the shared secret.

Figure 6:
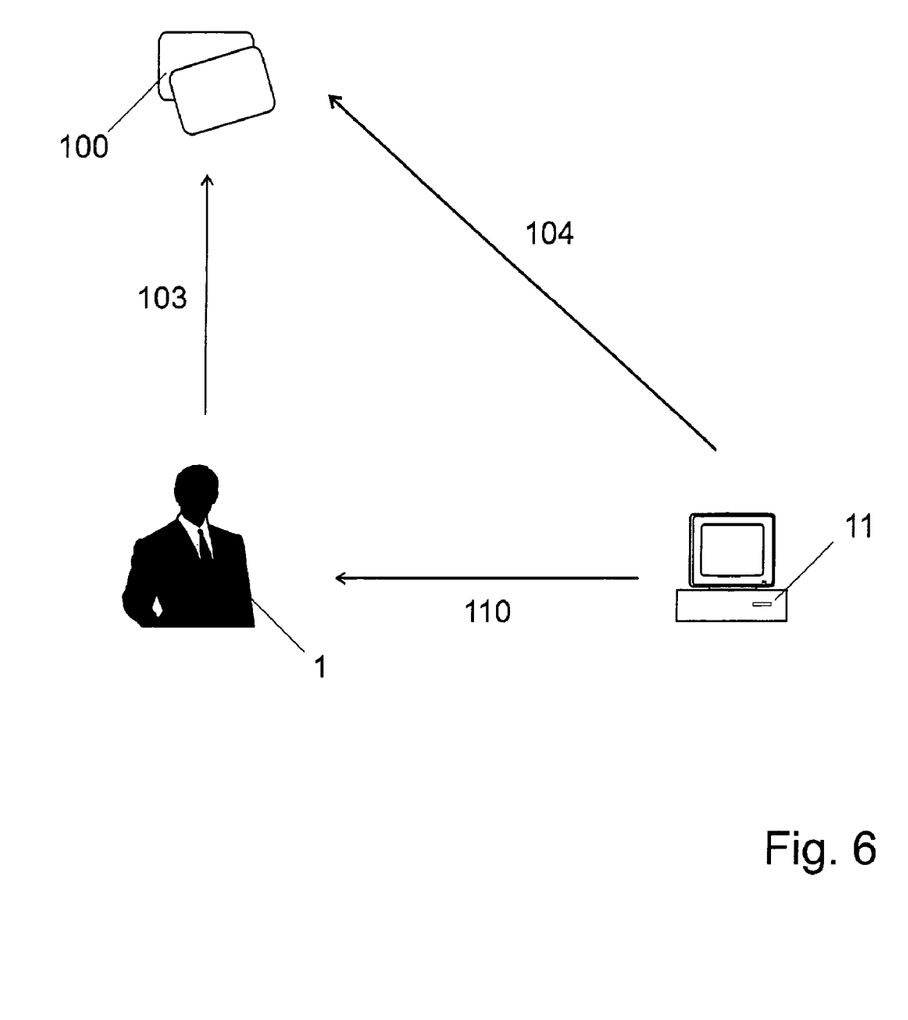
FIG. 6 illustrates the transmission of the shared secret through secure channels via the user in a second embodiment of the invention.

In these situations, another embodiment of the method of the invention can be used. This second embodiment does not rely on any assumptions regarding the confidentiality of the mobile display 102 or the terminal keyboard 111, but uses an already existing confidential channel 104 between the terminal 11 and the smart card 100 which is realized by the encryption with the public key of the user 1 ($K_u$), to establish a shared secret between the terminal 11 and the smart card 110. The situation is illustrated in FIG. 6.

This channel 104, however, is not authentic, because anybody can encrypt with the public key of the user 1. To ensure authenticity of the established shared secret, the terminal 11 encrypts it together with a first secret (one-time password p). In order for the smart card 100 to be able to verify this password, the terminal 11 sends its cryptographic hash value to the smart card 100 via an already existing authentic channel that is formed by the combination of the display 110 of the terminal, the user 1 and the keypad 103 of the mobile device 10. The protocol is illustrated in table 10 and described as follows:

U→T: U

User 1 (U) types her identifier U in terminal 11 (T) using the keyboard 111 of the terminal 11 (tk). U must be the identifier which is contained in the public key certificate $cert_u$ of the user 1. This certificate is sent to the terminal 11 later.

T→U: h(p)

The terminal 11 generates a random number p (first secret/one-time password) and computes its hash value using the publicly known cryptographic hash function h. It then displays the hash value h(p) on the display 110 (td).

U→C: h(p)

The user 1 reads the hash value from the display 110 and sends it to the smart card 100 (C) via the keypad 103 of the mobile device 10 (mk).

C→T: $cert_u$

The smart card 100 then sends the public key certificate $cert_u$ of the user 1 to the terminal 11 via the wireless link 101 (wl). The terminal verifies if the identifier of the user 1 in the certificate matches U which was typed in by the user. It waits until a matching certificate arrives. Then the terminal also verifies the digital signature on the certificate.

T→C: $\{p, r\}_{Ku}$

The terminal 11 generates another random number r (the future shared secret), and encrypts p together with r with the public key $K_u$ of the user. This public key is obtained from the certificate $cert_u$. The terminal 11 then sends the encrypted block to the smart card 100. Only the smart card 100 can decrypt this encrypted block with the private key of the user 1. After decryption, the smart card 100 verifies if the hash value of the first number p is equal to h(p) that was typed in by the user before. If so, then it accepts the message. The rationale is that, because of the properties of the cryptographic hash function h, nobody else but the terminal 11 can know p, and, thus, only the terminal 11 can generate a message that contains p (note also that the message is encrypted, therefore, an attacker cannot learn and use p). Now, the smart card 100 and the terminal 11 have a shared secret r, which they can use to protect the integrity and prove the authenticity of the subsequent two messages that they exchange.

T→C: m, $MAC_r$(m)

C→T: m', $MAC_r$(m')

Message m and m' are protected by attaching message authentication codes ($MAC_r$) to them. The computation of the $MAC_r$ depends on the shared secret r in a way that computing a valid $MAC_r$ for a given message is hard without the knowledge of r. Thus, only the terminal 11 and the smart card 100 can generate a valid $MAC_r$ for the messages m and m'.

(msg 1) U→T: U
(msg 2) T→U: h(p)
(msg 3) U→C: h(p)
(msg 4) C→T: $cert_u$
(msg 5) T→C: $\{p, r\}_{Ku}$, m, $MAC_r$(m)
(msg 6) C→T: m', $MAC_r$(m')

Table 10. The Second Embodiment Protocol

Integration with SSL

Figure 7:
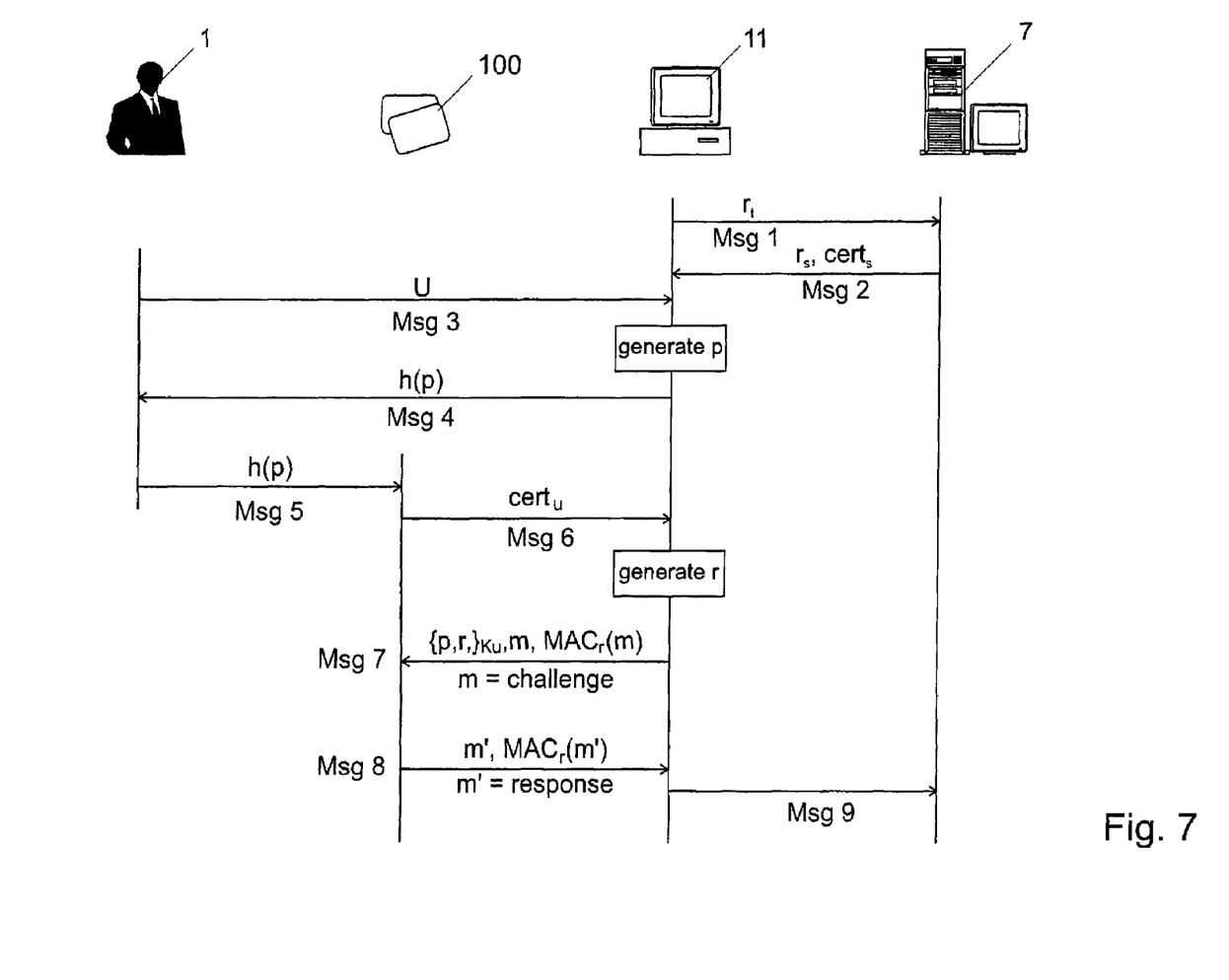
FIG. 7 illustrates the messages which are exchanged between the principals over the various channels in the second embodiment of the invention.

Similarly to the first embodiment, this protocol can also be integrated with SSL, as it is shown in Table 11 and in FIG. 7.

(msg 1) T→S: $r_t$
(msg 2) S→T: $r_s$, $cert_s$
(msg 3) U→T: U
(msg 4) T→U: h(p)
(msg 5) U→C: h(p)
(msg 6) C→T: $cert_u$ (broadcast over the wireless link 101)
(msg 7) T→C: $\{p, r\}_{Ku}$, m, $MAC_r$(m) where m=g(s, $msg_1$, $msg_2$),
(msg 8) C→T: m', $MAC_r$(m'), where m'=$Sig_u$(g(s, $msg_1$, $msg_2$))
(msg 9) T→S: $cert_u$, $\{s'\}_{Ks}$, m'

Table 11. Integration of the Second Embodiment with SSL

The terminal 11 starts the SSL protocol with the server 7. After the exchange of the first two messages, it needs a digital signature of a message computed with the challenge $r_s$, $cert_s$ sent by the server 7; this signature can be generated only by the smart card 100. In order to establish a secure link to the smart card 100, it starts the inventive protocol. It displays an input window on the display 110 and inputs the identifier of the user 1. Then it generates a random number p (first secret), computes its hash value h(p) with a publicly known hash function, and displays the result on its display 110. The user 1 types the displayed value h(p) on the keypad 102 of the mobile device 10 which sends it to the smart card 100. The smart card broadcasts the public key certificate $cert_u$ of the user 1 to the terminal 11 via the wireless link 101. The terminal 11 generates another random number r, which will be a shared secret between the terminal 11 and the smart card 100 later. It encrypts r together with p with the public key $k_u$ of the user 1. Then it sends the encrypted block and the challenge m that has to be signed by the smart card 100 to the smart card via the wireless link 101. This message is protected with a $MAC_r$ that is already computed using r. Upon receiving this message, the smart card 100 decrypts the encrypted block, and checks whether the hash value h(p) of the first number p matches the value that has been typed in by the user 1 on the keypad 103 of the mobile device 10. If so, then it checks the $MAC_r$ using the other received number r. If the $MAC_r$ verification is successful, then it signs the challenge m, and sends the response m' back to the terminal 11 together with a $MAC_r$ that is computed using r. The terminal 11 checks the $MAC_r$, and if it is correct, then it completes the SSL protocol with the server 7 by sending it the answer m'.

The Length of the Hash Value h(p)

The security of this embodiment heavily depends on the properties of the hash function h. If an attacker were able to find a number p', such that h(p')=h(p), then he could send a fake message to the smart card 100 with the encrypted block $\{p', r'\}_{Ku}$, where r' is a number chosen by the attacker. Since h(p')=h(p), the fake message would pass the verification successfully, and the smart card 100 would believe that it shares the secret r' with the terminal 11, whereas, in fact, it would share it with the attacker. The standard property that we require h to satisfy is called one-wayness, and it says that given an output y, it is computationally infeasible to find an input x, such that h(x)=y.

Even for a "strong" h, it is easy to find an input x for a given output y, such that h(x)=y, if the output length of h (i.e., the length of y) is short. More precisely, we can say the following. Let h: X→Y be a cryptographically strong hash function, which maps a finite length input from the set X into a finite length output from the set Y, where Y has (many) less elements than X. Let $X_y$={x: h(x)=y} for any output y. Let us fix a randomly selected output y* and denote the probability that a randomly selected input x maps into y* (i.e., h(x)=y*) with $\epsilon$. Then $\epsilon = \#X_{y^*}/\#X$, where $\#X_{y^*}$ and $\#X$ denote the number of elements in $X_{y^*}$ and X, respectively. If we assume that $\#X_y \cong \#X_{y'}$ for any y and y' (which is usually the case for many hash functions), then $\#X_y \cong \#X/\#Y$ for any y, and, consequently, $\epsilon \cong 1/\#Y$. For instance, if h maps into the set of 20 bit numbers, then $\epsilon \cong 2^{-20} \cong 10^{-6}$, which means that if we select 1 million inputs randomly, then it is almost certain that one of these will map into y*. Note that we do not require the hash function h to be collision resistant.

In practice, this means that an attacker with considerable computing power can successfully mount an attack against the protocol if h(p) is short. Therefore, the output length of h should be sufficiently long. On the other hand, the user 1 has to type the hash value displayed by the terminal 11 into the mobile device 10. If the hash value is too long, then it is not convenient for the user 1 to type it in. Thus, the output length of the hash function should be the shortest length that still provides a sufficient level of security.

One should also take into consideration that the time available for an attacker to find a pre-image for a given output is limited and equal to the time between displaying h(p) on the display 110 of the terminal 11 and sending $\{p, r\}_{Ku}$ to the smart card 100. Thus, the time available for an attack is on the order of seconds.

In a preferred embodiment, the output length is chosen to be 60 bits. This requires an attacker to try around $2^{60}$ inputs in a few seconds, which is not feasible with current computing technology. The 60 bit long hash value can be represented by a 12 character long string, where the characters are from the set $\{0, 1, 2, \ldots, 9, A, B, C, \ldots, V\}$. Since this set has 32 elements, each character can represent 5 bits.

We will now describe an example of the pseudo-code which may be run by the computing means in the smart card 100 and by the terminal 11 in order to carry out this second embodiment. The one skilled in the art will be able to write the necessary modules in the smart card and in the terminal which correspond to those pseudo-codes.

Pseudo-Code Run by the Terminal 11
1. One time set-up: initialise a random number generator PRNG in the terminal with a truly random seed
2. Construct (get) the message to be sent: $r_s$, $cert_s$ (msg2)
3. Input the user identifier: U (msg3)
4. Get the next random number (first secret) from the PRNG: p
5. Compute the hash of p: h(p) with a publicly known hash function
6. Display h(p) (in base 32 encoding) on the display 110 (msg 4)
7. Listen on the wireless interface 101 until a broadcast message arrives (msg6).
8. If msg6 is a certificate which contains the user identifier U, then go to step 9, else go to step 7
9. Extract the public key from the certificate: $K_u$
10. Get the next random number (second secret) from the PRNG: r
11. Encrypt p and r with $K_u$: $\{p, r\}_{Ku}$
12. Compute the $MAC_r$ of m: $MAC_r(m)$
13. Send $\{p, r\}_{Ku}$, m, $MAC_r(m)$ to the sender of M1
14. Listen on the wireless interface 101 until a message arrives: msg8
15. If msg8=m', mac' (msg8 has the right format), then go to 16, else raise an exception and stop
16. Compute the $MAC_r$ of m': $MAC_r(m')$
17. If mac'=$MAC_r(m')$, then go to step 18, else raise an exception and stop
18. End of protocol Pseudo-Code Run by the Smart Card 100
1. Input the hashed random number (in base 32 encoding): msg5
2. Broadcast the user certificate $cert_u$ (msg6)
3. Listen on the wireless interface 101 until a message arrives: msg7
4. If msg7=C, m, MAC (msg7 has the right format), then go to step 5, else raise an exception and stop
5. Try to decrypt C with the private key of the user 1: P
6. If P={p, r} (P has the right format), then go to step 7, else raise an exception and stop
7. If h(p)=msg5, then go to step 8, else raise an exception and stop
8. Compute the $MAC_r$ of m: $MAC_r(m)$
9. If MAC=$MAC_r(m)$, then go to step 10 else raise an exception and stop
10. Construct the response: m'
11. Compute the MAC of m': $MAC_r(m')$
12. Send m', $MAC_r(m')$ to the sender of msg7 (msg8)
13. End of protocol Conclusion Both embodiments can be used to build an authentic logical channel between the terminal 11 and the smart card 100 of the user 1, when the communication between these devices is based on short distance wireless technologies, e.g. on Bluetooth or IrdA technologies. The protocols are best suited for user authentication applications (e.g. authentication of users who want to access confidential Web pages from remote terminals).

The first embodiment described relies on more assumptions about the existing channels between the smart card and the terminal than the second one. In particular, the first embodiment uses a channel that is authentic and made confidential for a short period of time to establish a shared secret between the smart card and the terminal. In contrast, the second embodiment uses only an authentic channel to setup a one-time password that is used to authenticate the terminal in a later step of the protocol.

On the other hand, the first embodiment is much simpler. Furthermore, in this first embodiment the user has to type in a random string on the keyboard 111 of the terminal 11, while in the second embodiment, she has to type in a (longer) random string on the keypad 103 of the mobile device 10.

Thus, the first embodiment is probably more convenient for users, although it is less secure than the second one.

Implementation Guidelines

The wireless link 101 between the smart card 100 in the user's equipment and the terminal 11 can be based on radio or infrared communications. We assumed the existence of an appropriate addressing scheme, which makes it possible to send a message directly to an intended receiver if its address is known, and an appropriate MAC (Multiple Access Channel) algorithm, which governs access to the shared radio channel. We did not assume, however, that a party knows the MAC address of another party when beginning a transaction with it. We designed the protocols in a way that they can perform address resolution functions seamlessly. For this reason, in each protocol, the first message that is sent over the wireless interface should be a broadcast message, which is received by every station within the communication range of the sender. This first message always contains enough information for a receiver to decide whether it has to take care of it, or it is a message for someone else. The intended receiver can, thus, recognize which broadcast message is sent to it and respond to it. Since the broadcast message can contain the MAC address of the sender, the receiver can send the response directly to the sender. The response can also contain the MAC address of its sender (the intended receiver of the broadcast message). Thus, after the first message exchange, both communicating parties know the address of the other and can send messages directly to each other.

Let us consider the second embodiment of the invention as an example. The first message sent over the wireless link 101 is the certificate of the user $cert_u$ (msg 6). The smart card 100 broadcasts this message, so that all listening terminals 11 will receive it. A receiver compares the user identifier in the certificate $cert_u$ to the identifier typed in by the user 1 at the beginning of the protocol. If they match, then this terminal 11 is the intended receiver of this broadcast message. This terminal 11 can then send the appropriate response directly to the smart card 100. After reception of this response, the smart card 100 and the terminal 11 know each other's MAC addresses. Note that a malicious terminal 11 cannot send a correct response to the broadcast certificate, because the correct response should contain the one-time password p, which is exclusively known to the intended terminal.

The protocol my be implemented with software in the terminal 11 and in the smart card 100 implemented with a current cryptographic library, for example with the ABA JCE. This library is a pure java implementation of the JCE (Java Cryptography Extension) interface defined by Sun Microsystems Inc.

Message Authentication Codes (MAC)

Both embodiments uses message authentication codes (MACs) to protect the integrity and prove the authenticity of messages sent by the smart card and the terminal to each other. A message authentication code is a keyed hash function. In a preferred embodiment, we can use either the MAC algorithm based on MD5 or the one based on SHA, which are available in the ABA JCE cryptographic library under name HmacMD5 and HmacSHA.

Although the embodiments of the invention described with reference to the drawings comprise equipments such as terminals, smart cards and mobile equipments, and methods performed in or by such equipments, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the methods and protocols according to the invention. The carrier may be any entity or device capable of carrying the program.

For example, the carrier may comprise a storage medium, such as a ROM, for example a CD-ROM or a semiconductor ROM, for example an EEPROM, or a magnetic or optical recoding medium, for example a floppy disc, hard disk or smart card. Further, the carrier may be a transmissible carrier such as an electrical or optical signal which may be conveyed via electrical or optical cable or by radio or other means.

When the program is embodied in a signal which may be conveyed by a cable or other device or means, the carrier may be constituted by such cable or other device or means. Alternatively, the carrier may be an integrated circuit in which the program is embedded, for example a memory in the terminal 11, in the mobile equipment 10 or in the smart card 100.

The invention claimed is:

1. A method for securing a session over a short distance wireless link between a terminal and a user device, said terminal and said user device both comprising cryptographic computing means, said terminal and said user device further both comprising a display and input means, wherein said terminal and said user device can be connected through said short distance wireless link, said method comprising the steps of:
generating a secret in said terminal or said user device,
displaying said secret or the hash value of said secret on the display of said terminal or said user device,
while said user device and said terminal are kept separate from each other,
manually entering said secret or the hash value of said secret on the input means of the other one of said terminal or user device, and
using said shared secret to guarantee the authenticity of at least a part of said session between said user device and said terminal over said short distance wireless link.

2. The method of claim 1, wherein said cryptographic computing means in said user device use a smart card in said user equipment.

3. The method of claim 1, wherein said cryptographic computing means in said terminal are part of a browser in said terminal.

4. The method of claim 2, wherein said secret comprises a first random word generated in said smart card, said random word being displayed on said display of said user device and then entered by the user of said user device on said terminal, said method further comprising:
generating a challenge in said terminal,
computing in said terminal a first message authentication code based on said first random word and on said first challenge,
transmitting said first message authentication code over said wireless interface to said user device,
generating a response to said challenge in said user device,
computing in said user device a second message authentication code based on said first random word and on said response,
transmitting said second message authentication code over said wireless interface to said terminal.

5. The method of claim 1, further comprising:
encrypting in said terminal at least one first message comprising said secret with the public key of said user device, sending said first message over said wireless interface to said user device,
decrypting said first message in said user device,
verifying said secret in said user device.

6. The method of claim 5, wherein said first message further comprises a second secret used for securing subsequent messages in said session.

7. The method of claim 6, further comprising a preliminary step of transmitting a user certificate stored in a smart card in said user device to said terminal over said wireless interface, said user certificate comprising said public key of said user.

8. The method of claim 7, wherein said first message is obtained by encrypting in said terminal said first secret and said second secret with the user public key obtained from said user certificate, said encrypted first and second secrets being decrypted in said user device, said second secret being used for securing at least a part of the subsequent messages in said session.

9. The method of claim 8, further comprising a preliminary step of sending a user identifier to said terminal, wherein said user identifier can be used to select said user certificate from the set of received certificates.

10. The method of claim 9, further comprising a step of comparing said first random word received in said message with the hash value of said random word that was entered before.

11. The method of claim 4, wherein said first challenge is computed in said terminal from the following components:
a random word generated in said terminal,
a random word generated in a server with which said terminal wants to establish a secure connection,
a certificate of said server,
a secret computed in said terminal from another random word generated in said terminal, from said random word generated in said terminal and from said random word generated in a server.

12. The method of claim 11, wherein said response is computed from the following components:
the private key of the user stored in said smart card,
a random word generated in said terminal,
a random word generated in a server with which said terminals wants to establish a secure connection,
a certificate of said server,
a secret computed in said terminal from another random word generated in said terminal, from said random word generated in said terminal and from said random word generated in a server.

13. The method of claim 1, wherein said secret is generated in said terminal, said method further comprising:
entering a user identifier in said terminal,
generating a first secret in said terminal,
displaying a hash value computed from said secret, on the display of said terminal,
entering said hash value in said user device,
transmitting a user certificate stored in said smart card to said terminal over said wireless interface, wherein said user identifier can be obtained from said user certificate,
generating said secret in said terminal,
encrypting in said terminal said first secret and said second secret with the user public key obtained from said user certificate,
transmitting said encrypted secrets to said user device,
decrypting said encrypted first and second random words in said user device,
comparing in said user device the hash value of said first secret with said hash value, that was entered before,
generating a first challenge in said terminal,
computing in said terminal a first message authentication code based on said second secret and on said first challenge,
transmitting said first message authentication code to said user device,
generating a response in said user device comprising a smart card,
computing in said user equipment a second message authentication code based on said second secret and on said response,
transmitting said second message authentication code over said wireless interface to said terminal.

14. The method of claim 13, wherein said first challenge is computed in said terminal from the following components:
a random word generated in said terminal,
a random word generated in a server with which said terminal wants to establish a secure connection,
a certificate of said server,
a secret computed in said terminal from another random word generated in said terminal, from said random word generated in said terminal and from said random word generated in a server.

15. The method of claim 14, wherein said response is computed from the following components:
the private key of the user stored in said smart card,
a random word generated in said terminal,
a random word generated in a server with which said terminals wants to establish a secure connection,
a certificate of said server,
a secret computed in said terminal from another random word generated in said terminal, from said random word generated in said terminal and from said random word generated in a server.

16. The method of claim 1, wherein said user device is a digital mobile phone.

17. The method of claim 16, wherein said wireless interface is a Bluetooth interface.

18. The method of claim 16, wherein said wireless interface is a HomeRF interface.

19. The method of claim 16, wherein said wireless interface is an IrdA interface.

20. A smart card having thereon a computer program comprising instructions to be executed by processing means included in said smart card for causing the smart card to perform a process comprising the steps of:
generating a secret,
preparing an instruction for displaying said secret on the display of a device in which said smart card is adapted to be used, so that said displayed secret can be manually entered into a separate device for use in computing a broadcast message,
waiting until the broadcast message arrives, and
checking if said secret has been used for computing said broadcast message so that a secured communication session can be established between said device and said separate device.

21. The smart card of claim 20, further comprising a random number generator, said secret being generated by said random number generator.

22. The smart card of claim 20, said process further comprising the following steps:
if said secret has been used for computing said broadcast message, computing a response to said broadcast message,
preparing an instruction for sending said response to the sender of said broadcast message.

23. The smart card of claim 22, said secret being used for computing said response.

24. The smart card of claim 22, further comprising a counter, the value in said counter being modified each time one of said broadcast message arrives, said response being sent only if the value in said counter has not reached a predetermined limit.

25. The smart card of claim 20, further comprising a GSM-part.

26. A computer readable recording medium storing a computer program comprising computer executable instructions for causing a computer including a short distance wireless interface to execute a process comprising the steps of:
   getting a message to be sent over said wireless interface,
   getting a secret manually entered by a user on the input means of said computer,
   computing a message authentication code from said message using said secret,
   broadcasting said message authentication code,
   listening on said wireless interface until a message arrives, and
   verifying if the message has been computed with said secret.

27. A computer readable recording medium storing a computer program comprising computer executable instructions for causing a computer including a short distance wireless interface to execute a process comprising the following steps:
   generating a first secret,
   displaying said secret, or the hash value of said secret, on the display of said computer,
   listening on said wireless interface until a broadcast message arrives,
   extracting a public key from said broadcast message,
   generating a second secret,
   encrypting said first and said second secret with said public key,
   sending said encrypted first and second secret to the sender of said broadcast message,
   listening on said wireless interface until a second message arrives, and
   checking if said second secret has been used for computing said second message.

28. A smart card having thereon a computer program comprising instructions to be executed by processing means in said smart card for causing the smart card to perform a process comprising at least the following steps:
   getting a first secret entered in said smart card via the keypad of a user equipment,
   broadcasting a user certificate stored in said smart card,
   waiting for a message,
   decrypting said message with the private key of the user,
   extracting a second secret from said message,
   verifying if the sender of said message knows said first secret, and
   computing a response with said second secret.

29. The smart card of claim 28, said process further comprising the following steps:
   if said secret has been used for computing said broadcast message, computing a response to said broadcast message, preparing an instruction for sending said response to the sender of said broadcast message.

30. The smart card of claim 29, said secret being used for computing said response.

31. The smart card of claim 28, further comprising a GSM-part.

32. A method for securing a session over a wireless link between a terminal and a portable device used by a user, said terminal and said portable device both comprising cryptographic computing means, said portable device further comprising a display and said terminal further comprising an input means, wherein said terminal and said portable device can be connected together through said wireless link, said method comprising the steps of:
   generating a secret in said portable device,
   displaying said secret or the hash value of said secret on the display of said portable device,
   the user manually entering said secret or the hash value of said secret on the input means of the terminal, and
   using said entered secret to guarantee the authenticity of at least a part of said session between said terminal and said portable device over said wireless link.

33. The method of claim 32 supported by a smart card inserted in said portable device.

34. A smartcard for inserting in said portable device for supporting the method of claim 32.

* * * * *